United States Patent [19]

Burkholder

[11] 4,120,561

[45] Oct. 17, 1978

[54] LIGHT REFLECTIVE SIGNALING AND WARNING DEVICE

[76] Inventor: Clinton M. Burkholder, 11 Bowman St., Westborough, Mass. 01581

[21] Appl. No.: 663,925

[22] Filed: Mar. 4, 1976

[51] Int. Cl.$^2$ .............................................. G02B 5/12
[52] U.S. Cl. ................................ 350/99; 280/289 R; 350/97
[58] Field of Search ................. 350/97, 99, 103, 105, 350/100, 101, 104, 106; 301/37 SA; 280/35 R, 1.5, 289R, 289; 428/339, 31, 7, 203; 48/58, 59

[56] References Cited

U.S. PATENT DOCUMENTS

| 1,089,003 | 3/1914 | Mayerle | 40/138 |
| 1,583,881 | 5/1926 | Heberling | 46/58 |
| 1,798,052 | 3/1931 | Additon | 350/99 |
| 1,823,240 | 9/1931 | Cobb | 350/105 |
| 1,976,093 | 10/1934 | Raymond | 428/7 |
| 2,344,542 | 3/1944 | Fike | 301/37 SA |
| 2,503,509 | 4/1950 | Rader | 350/105 |
| 2,701,540 | 2/1955 | Hamilton | 350/99 |
| 2,987,103 | 6/1961 | Yakubik | 428/203 |
| 3,029,702 | 4/1962 | Rupert | 350/103 |
| 3,310,357 | 3/1967 | Hogan | 350/99 |
| 3,494,065 | 2/1970 | Beuttinen et al. | 43/423 |
| 3,578,840 | 5/1971 | Richards | 350/99 |
| 3,871,336 | 3/1975 | Bergman | 119/106 |

FOREIGN PATENT DOCUMENTS 936,088  9/1963  United Kingdom .................... 160/156

Primary Examiner—John K. Corbin
Assistant Examiner—B. Wm. de los Reyes
Attorney, Agent, or Firm—Lewis M. Smith, Jr.

[57] ABSTRACT

A light reflective signaling and warning device shaped and arranged relative to an encompassing reference sphere so that light directed toward the signaling and warning device from any area on the reference sphere is reflected toward the same area, self-articulated to intensify light reflection therefrom, color coded to indicate the disposition of the signaling and warning device relative to a source of light, and restorably deformable under the temporary application of excessive force thereto, widely useful in diverse different applications.

3 Claims, 8 Drawing Figures

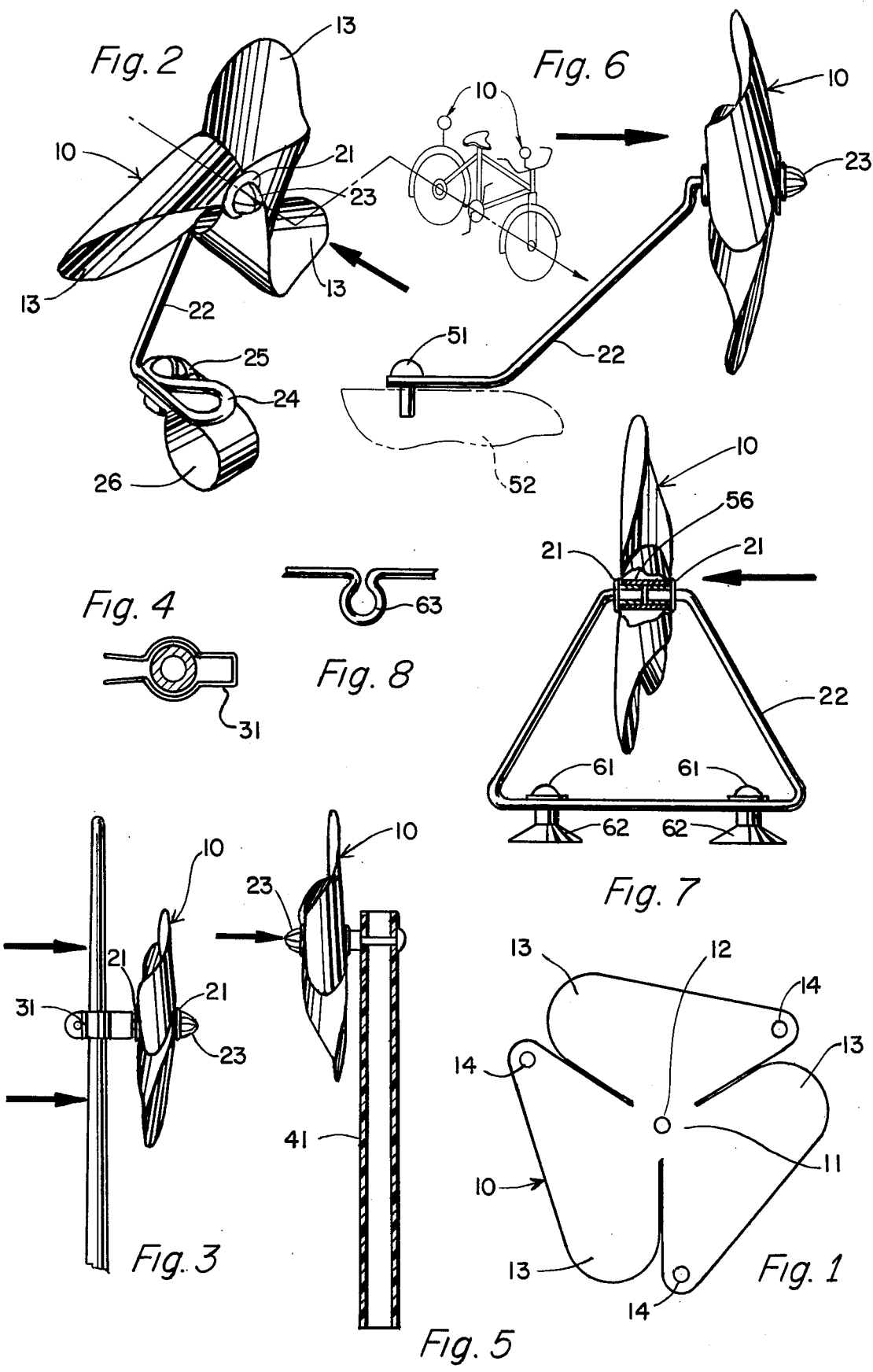

LIGHT REFLECTIVE SIGNALING AND WARNING DEVICE

FIELD OF THE INVENTION

The present invention is of the class of devices designed to indicate by reflected light, especially at night or under other adverse weather conditions, the location and possibly also the relative attitude of a fixed, movable, or moving object to which the present invention is attached.

BACKGROUND OF THE INVENTION

The prior art teachings relating to light reflective signaling and warning devices include a metal propeller with a spiral pattern of fluorescent paints applied to one surface thereof intended especially for use on the rear of a bicycle, as described in U.S. Pat. No. 2,701,540 issued Feb. 8, 1955. As illustrated and described, this device would reflect light toward sources of light located over most of the surface of a reference hemisphere to the rear of the bicycle on which it is mounted, but not toward the front of the bicycle. In addition, any substantial deflection of this metal propeller would be permanent and tend to diminish or destroy its utility.

In column 1, lines 19 through 37 thereof, U.S. Pat. No. 3,684,348 to Rowland traces the long history of interest in the development of retroreflective materials, that is, materials capable of reflecting the bulk of the light rays impinging thereon along a substantially parallel path toward the source of the light, citing U.S. patents dating from 1906 concerned with the use of cube corner reflectors and referring to the flexible material comprising minute glass spheres embedded in a thin matrix of synthetic resin and sold under the trademark SCOTCHLITE by Minnesota Mining and Manufacturing Company.

Hereinafter, the term "retroreflecting" is to be understood and interpreted as referring specifically and only to " . . . materials capable of reflecting light rays impinging thereon along a substantially parallel path toward the source of the light . . . ," an important feature of the rotatable element incorporated in the instant invention, as compared to the many materials variously employed in the class of light reflective devices and merely described as "reflective" rather than as being "retroreflecting".

The light retroreflective material described and claimed in U.S. Pat. No. 3,684,348 to Rowland, manufactured as described and claimed in U.S. Pat. No. 3,810,804 to Rowland, lends itself especially well to incorporation in the instant invention, because of its high degree of flexibility, and preferably includes as its damage resistant front face a flexible light transparent sheet material having a thickness of 0.002–0.030 inch and preferably about 0.003–0.010 inch thick, to the rear face of which is adhered a continuous array of cube corner formations preferably each having side edge dimensions not more than 0.010 and most desirably on the order of 0.004–0.008 inch.

The Rowland light retroreflective material is also particularly well suited to use in the instant invention because it is understood to be about four times as reflective as any comparable material presently available, at least in part accounting for the results obtained in a test of the present invention in comparison to adjacent electric lights on a vehicle under actual operating conditions, which test is described further below under the heading, OPERATION OF THE PREFERRED EMBODIMENT.

BRIEF DESCRIPTION OF THE PRESENT INVENTION

The present invention features a unitary flexible light reflective rotatable element including a centrally supported central portion surrounded by multiple arcuately curved mutually convergent extended portions all together so shaped and supported as to form a body which is self-rotating responsive to relative movement between the body and an ambient fluid such as air or water, for example.

With both surfaces of the rotatable element covered completely with a light retroreflective material, light from any source in an area anywhere on the surface of a reference sphere enveloping the rotatable element is reflected to its source, so that it is visible with the rotatable element at rest and is more intensely visible when the rotatable element is rotating. In other words, the rotatable element of the present invention is light responsive in any direction either in its passive non-rotating mode of operation or in its normal rotating mode of operation.

Hereinafter, the phrase "in any direction" as used to describe the light responsive characteristics of the present invention is to be understood and interpreted as referring to all of the infinite number of radially extending paths between the surface and the center of a reference sphere enveloping the light retroreflective rotatable element of the present invention.

With each surface of the rotatable element covered completely with a light retroreflective material of a color different than that of the other surface of the rotatable element, the rotatable element reflects light therefrom in a color combination or a single color indicative of the spatial orientation of the rotatable element relative to the source of the reflected light, and hence the orientation of a vehicle or other object relative to the source of the reflected light, if the rotatable element is mounted in a predetermined spatial relation to such vehicle or other object.

It is this conspicuous color differential between the respective surfaces of the rotatable element which allows the device comprising the present invention to function, not only as a warning device simply by retrofeflecting light to indicate its presence to an observer adjacent to a source of light, but also as a signaling device by retroreflecting light color coded to indicate the orientation of the rotatable element relative to an observer adjacent to a source of light.

The present invention, including as its principal functional element a unitary flexible light reflective rotatable element made of material tending to recover its original functional shape whenever any portion thereof is temporarily deformed by contact with another object, is particularly well suited to use as a warning device for various vehicles such as bicycles, for example.

BRIEF DESCRIPTION OF THE DRAWINGS

FIG. 1 is a plan view of the preferred embodiment of the unitary flexible rotatable element of the instant invention, FIG. 2 is a perspective view of the preferred embodiment of the instant invention with the central portion and the arcuately curved mutually converging extended portions of the rotatable element mounted upon and secured to a universal mounting means of attachment to various different projecting portions of a bicycle, FIG. 3 is a side elevation, partially broken away, of an alternative embodiment of the instant invention showing the rotatable element of the instant invention mounted behind the upper end of a radio antenna or other whip-type structure attached to an automobile or bicycle or other vehicle or other device, FIG. 4 is a top view, partially in section, of the mounting means illustrated in FIG. 3, shown in operative relation to a whip-like structure.

FIG. 5 is a side elevation, partially in section, of another alternative embodiment which comprises a mounting means of hollow semi-flexible material with the rotatable element of the instant invention secured to one end thereof, said mounting means being designed to be hand held and manipulated, alternatively to be fitted over the upper end of the radio antenna on an automobile, and alternatively to be clamped in the window, door, hood or trunk of an automobile, FIG. 6 is a side elevation of still another alternative embodiment of the instant invention in which the rotatable element is secured to the outer extremity of a substantially horizontally extending rotatably supported mounting means so that the rotatable element weather vanes as well as rotates, in order to indicate at all times the direction of the wind relative to an object such as a mooring buoy, for example, on which it is mounted.

FIG. 7 is a side elevation, partially in section, of yet another embodiment of the mounting means for the rotatable element of the instant invention arranged to clamp the rotatable element between its ends and provided with multiple spaced attachment means such as suction cups, for example so that it may readily be secured at a predetermined azimuth angle relative to a vehicle such as a boat or another object, and FIG. 8 is a broken away detail of the mounting means illustrated in FIG. 7, showing a portion thereof shaped to receive the shank of an attachment screw for the suction cup shown in FIG. 7, or to receive any other suitable attachment means.

DETAILED DESCRIPTION OF THE PREFERRED EMBODIMENT

Referring now to the drawings wherein like reference numerals refer to like or corresponding parts, the preferred embodiment of the instant invention includes a unitary flexible light reflective rotatable element generally designated by the numeral 10 comprising a central portion 11 thereof with a central opening 12 therethrough encircled by multiple adjacent extended portions 13 each with an opening 14 therethrough adjacent one outer extremity thereof, three of which are shown in FIG. 1. However, it will be apparent from the following description that the number of extended portions 13 surrounding the central portion 11 of the rotatable element 10 may be two or four or more as may be suitable for various different applications of the instant invention.

Referring further to the showing in FIG. 1, the unitary flexible light reflective rotatable element 10 is composed of a central layer of opaque flexible material with smooth parallel white or light colored opposite side surfaces, and opposed outer layers of light transparent flexible retroreflective material as described in U.S. Pat. Nos. 3,684,348 and 3,810,804 to Rowland.

All three of the layers referred to in the preceding paragraph being cut to the periphal shape and punctured as shown in FIG. 1, they are all three hermetically sealed along the entire periphery of each extended portion 13 of the rotatable element and around the entire periphery of the opening 12 through the central portion 11 thereof and around the entire periphery of the opening 14 through each extended portion 13 thereof. While the central layer may be relatively thin and/or flexible in the rotatable element 10 when it is relatively small, four or five inches in diameter, for example, the central layer must be made of relatively thick and/or stiff material for use in a relatively large rotatable element, up to a foot or more in diameter for some applications.

Referring now to FIG. 2, the rotatable element is supported by opposing eyelets 21 or hollow rivets not fully visible in this view, in turn rotatably supported upon an elongated wire mounting means 22 and secured in place by a lock nut 23 enclosing the end of the wire mounting means 22 and not able to be removed without destroying the lock nut 23. The other end of the wire mounting means shown in FIG. 2 includes convolutions 24 and 25 of the proper size and shape to fit snugly over screws mounted upon or bolts projecting from a bicycle or a tricycle. The other end of the wire mounting means also selectively supports a circular band 26 of the proper size to be clamped around the handle bar of a bicycle or tricycle.

For the clearest showing of the eyelets 21 in operative relation to the rotatable element 10, see the sectioned portion of FIG. 7, in which the respective eyelets 21 occupy substantially the same relative positions as in the configuration shown in FIG. 2, but with the encircling sleeve required in the configuration shown in FIG. 7.

OPERATION OF THE PREFERRED EMBODIMENT

The arrows shown in FIG. 2 and in FIGS. 3, 5, 6 and 7 indicate the general direction of the relative movement of an ambient fluid such as air or water necessary to act against the front face of the rotatable element 10 of the instant invention. However, the rotatable element 10 is also rotated by relative movement of an ambient fluid against the rear face or any side of the rotatable element 10.

While it may seem redundant to add devices such as the one illustrated in FIG. 2 to a vehicle already equipped with electrically illuminated headlight and taillight assemblies, an actual test using a popular brand of modern motorcycle provided the contrasting results described below.

With the motorcycle traveling within the legal speed limit, the headlights of a following automobile shining upon the red rear surface of a device as shown in FIG. 2 rotating adjacent to the taillight of the motorcycle produced a red reflection visible to the driver of the automobile which was substantially brighter than the taillight.

Similarly, with the motorcycle traveling within the legal speed limit, the headlights of an approaching automobile shining upon the white front surface of a device as shown in FIG. 2 rotating adjacent to the headlight of the motorcycle produced a reflection visible to the driver of the automobile which was substantially whiter and brighter around the periphery of the rotatable element than the headlight.

From consideration of the showing in FIG. 2 of the drawing, it will be apparent the rotatable element 10, shaped and supported rotatably as illustrated in FIG. 2, and provided with a retroreflective white front surface and a retroreflective red rear surface, will, as it is rotated, serve not only as a warning device by retroreflecting light from a given source toward an observer located adjacent to the given light source, but also as a signaling device effective to indicate to the same observer its relative spacial disposition. Specifically, when element 10 is seen from the front, the observer of the rotating element sees a white circular peripheral portion separated from a red circular central portion by an annular band of mixed white and red or "pink"; when element 10 is seen from the rear, the observer of the rotating element sees a single solid red disc; when element 10 is seen edgewise from any side thereof, the observer of the rotating element sees an elongated shape white at one end, red at the other end, and a central portion of mixed white and red or "pink"; and finally, when the pattern of different reflected colors progressively changes from one of these different color configurations to another, the changing pattern signals a progressive change in the spacial disposition of the element 10 relative to the observer.

These impressive test results clearly indicate that the device illustrated in FIG. 2 can be used most advantageously for the nighttime protection of persons riding bicycles not otherwise adequately protected by lights or reflectors of comparable efficiency, especially if its rearward and outermost surface is colored bright red to serve the light directing warning function of a taillight and its forward and innermost surface is stark white so it serves the light directing vehicle presence and attitude indicating function of a headlight, both suggested by the results of the tests described above. The same sort of device applied to a tricycle will not only intrigue its young rider, but also highlight a tricycle forgotten at the edge of the street or in the middle of the driveway.

The same sort of device with the same color code or any other suitable color combination, but preferably of a larger diameter, is suitable for the protection of moving farm and other work vehicles, mobile machinery, and immovable obstructions in dangerous locations, with the assurance movement of the unit to which this device is attached or relative movement of the ambient air, or both, will produce substantially intensified light reflection from this device.

DETAILED DESCRIPTION OF THE ALTERNATIVE EMBODIMENT AND OPERATION OF THE ALTERNATIVE EMBODIMENTS

Example I

Referring now to the showing in FIG. 3, the rotatable element illustrated in FIGS. 1 and 2 may, alternatively, be attached adjacent the upper end of an elongated wand of the type recently attached to bicycles to support flourescent pennants secured to the upper end thereof, with the added advantage that this type of mounting means tends to oscillate on a bicycle in motion, producing a consequent modulation of the intensity of reflection from the rotatable element of the device, as would a spring or flexible plastic mounting means.

Example II

One convenient means of mounting the rotatable element 10 adjacent the upper end of an elongated wand is a spring clip 31 shown both in FIG. 3 and in FIG. 4.

The same mounting means may be used to attach the rotatable element 10 to the upper end of the extended radio antenna of an automobile buried in a snow drift, so that the buried vehicle can be located more readily and from a greater distance by the occupants of a rescue vehicle or a snow plow, and thus without endangering the buried automobile or its occupants.

This configuration of an elongated wand or rod represented in FIG. 3 can also be mounted upright above the deck of a boat moored or adrift without lights at night, in order to indicate its location to other craft, with lights, approaching its location.

This same configuration can be suspended in the water beneath a boat with the rotatable element 10 adjacent its lower end to serve as a light reflective marker responsive to the hand carried working lights used by skin divers. With this arrangement, skin divers operating at night, even from an unlighted boat, can determine the relative location of the boat, and also its relative heading, if the rotatable element 10 is mounted at a predetermined azimuth relative to the boat and is color coded with different colors on its opposite sides.

In each of the several configurations of this alternative embodiment of the instant invention, the rotatable element 10 functions in either mode of operation in the manner described above in regard to the preferred embodiment of the instant invention.

Example III

Referring now to the alternative embodiment illustrated in FIG. 5, this configuration comprises a rotatable element 10 pivotally supported upon mounting means projecting from one end of a short hollow wand 41 made of a semi-flexible material and of a length conveniently held in a person's hand for manipulation of the rotatable element relative to the ambient fluid. As used here "semi-flexible" is descriptive of a material stiff enough to support the rotatable element 10 while it is manipulated relative to the air or other ambient fluid, and still deformable enough to allow the other end of the wand 41 to be clamped securely in various crevices on an automobile, such as between a window and its frame, between the hood and a fender, between the trunk and the body, or elsewhere. In addition, the hollow wand 41 is made of sufficient inside diameter to fit freely over the upper end of the extended radio antenna on an automobile.

While the preceding comments suggest the configuration shown in FIG. 5 is particularly useful for warning oncoming motorists at night of an unlighted automobile at the side of or on the highway, the same hand held configuration is useful for warning approaching motorists and others of an unseen hazard invisible in the darkness.

Here again, the function of the rotatable element in either mode of operation is as described in regard to the preferred embodiment of the invention.

Example IV

Referring next to the alternative embodiment illustrated in FIG. 6, this configuration comprises a rotatable element 10 pivotally supported upon the horizontally disposed free outer end of a horizontally extended elongated mounting means 22' to which it may be secured by a lock nut 23. The other end of the mounting means 22' circularly or otherwise shaped to receive suitable pivotal attachment means such as a rivet 51 to be press fitted into a hole in a surface symmetrical about the central axis of the attachment means 51 about which the mounting means 22' and the rotatable element 10 supported thereby are pivotal by weathervaning in response to changes in the direction of the wind relative to the surface upon which mounting means 22' is pivotally mounted.

This configuration of the invention is particularly useful when it is mounted upon the upper surface of a mooring buoy 52 for a boat, because it facilitates locating the mooring buoy from the boat after dark by light reflected toward the lighted boat, and because it indicates by its position, in turn indicated by its predetermined color code, the direction of the wind relative to the mooring buoy, so that the operator of the boat may make the proper approach to the mooring buoy.

Once more, the function of the rotatable element in either mode of operation is as described in regard to the preferred embodiment, with the exception that the rotatable element 10 mounted as shown in FIG. 6 functions also as a weathervane to indicate the direction of the ambient fluid relative to the body on which it is mounted pivotally, both vertically and horizontally.

Example V

Referring finally to the alternative embodiment illustrated in FIG. 7, this configuration comprises a rotatable element 10 pivotally supported upon the convergent opposing ends of a modified mounting means 22" shown as generally trapezoidally shaped, but alternatively shaped otherwise its opposite ends inserted into opposing eyelets 21 pivotally mounted thereon and in turn pressed into the hollow sleeve 56.

The mounting means 22" may be mounted in a predetermined azimuth relation to a body on which it is supported, and be secured in such position by two or more suction cups 62 attached to mounting means 22" by screws 61 passed through loops 63 in mounting means 22", one of which loops is illustrated in FIG. 8.

With one device as shown in FIG. 7, colored green on its innermost front side and colored white on its outermost rear side mounted at an angle toward the starboard side of a boat, and with another device as shown in FIG. 7, colored red on its innermost front side and colored white on its outermost rear side mounted at an angle toward the port side of the same boat, an otherwise unlighted boat either under way or adrift will reflect toward a light source light predominately of the color corresponding to the conventional running lights for a boat or a ship.

Again, the function of the rotatable element 10 in either mode of operation is as described in regard to the preferred embodiment.

SUMMARY

Thus, it may seen that the signaling and warning device of the present invention may be mounted, to good effect, either singly or in a suitably oriented array, at prominent positions on any vehicle not otherwise illuminated operating on land, in the air, or on or under the water.

This same signaling and warning device is obviously also desirable as a durable continuously operable standby illuminating system for any type vehicle normally illuminated by electric lights or lights otherwise powered, as evidenced by the impressive test results described above.

The configuration of this device shown in FIG. 5, designed particularly to be hand held and manipulated or to be mounted upon an automobile in the various ways described above, is also readily adaptable to other applications such as being mounted upon a rod thrust into the ground for use as an emergency signal instead of a flare or as a permanent marker for a bridge abutment or a throughway exit, or otherwise.

This device can, of course, be mounted permanently or semipermantly upon any moving, movable, or stationary object using any one of the mounting means illustrated in FIGS. 2, 3, 6 and 7, any modification thereof, or any other suitable mountings means.

As illustrated by the showing of the mounting means in FIG. 2 and 6, respectively, for example, the flexible unitary light reflecting rotating element may either be mounted in fixed spatial relation to a supporting vehicle so that different colors on its respective innermost and outermost surfaces will reflect different colored lights to indicate the relative attitude as well as the location of the supporting vehicle, or be mounted upon a buoy or other supporting object rotatably about and downstream of an ambient fluid from an upstream axis generally perpendicular to the axis of the rotation of the rotating element so that different colors on the respective innermost and outermost surfaces of the rotating element, continuously positioned angularly about the upstream axis like a weather vane, will reflect different colored light to indicate the direction of movement of the ambient fluid relative to a buoy or other supporting object.

In conclusion, where identification of one of many units such as one mooring buoy among dozens requires more different color combinations than single rotatable elements can provide, multiple rotatable elements, each color-coded as described above, may be mounted in groups on a single supporting means, in vertical array, in horizontal array, or in diagonal or triangular or other distinctive array, much in the manner in which the buoys marking lobster pots belonging to different owners are colorcoded.

The several embodiments and the various applications of this invention described above are intended to be illustrative rather than exhaustive of the many readily apparent modifications and the divergent useful applications thereof, and it is intended that this invention be limited only by the scope of the claims appended hereto.

What is claimed is:

1. A light retroreflective signaling and warning device comprising:
   a flexible unitary light retroreflecting rotatable element including a rotatably supported central portion in turn supporting multiple separate radially extended and returned portions all arcuately curved and mutually convergent so their respective extremities are all overlapped and mutually rotatably supported coaxially with said central portion,
   said central portion and said radially extended and returned portions of said rotatable element being so shaped and arranged that light rays directed toward the center of a reference sphere enveloping said device, from any area on the surface of the reference sphere, are retroreflected toward their source,
   the respective opposing surfaces of said flexible central portion and said flexible extended and returned portions of said rotatable element each being completely covered with a layer of light transparent material having a smooth damage resistant outer surface and protecting a continuous array of very small individually operative and collectively effective light retroreflecting elements, said respective layers of light transparent material respectively protecting said arrays of light reflecting elements also together enclosing an interposed opaque flexible central layer of material with its opposite sides comprising smooth light reflective surfaces, and each of the opposing surfaces of said flexible rotatable element being a conspicuously different predetermined color so that the single color or the respective configurations and the relative dispositions of the respective conspicuously different predetermined colors visible to an observer adjacent to the source of light retroreflected by said signaling and warning device indicates to the observer the spacial orientation of said signaling and warning device relative to the observer, and any progressive change in the color configurations and the color content of the retroreflected light seen by the observer signals the sense and the magnitude of a progressive change in the spacial orientation of said signaling and warning device relative to the position of the observer.

2. A signaling and warning device as described in claim 1., wherein:

said central portion and said extended and returned portions of said rotatable element are so shaped and arranged relative movement of said signaling and warning device and the ambient fluid produces rotation of said signaling and warning device and consequent intensified light retroreflection from both the outer and the inner surfaces thereof.

3. A signaling and warning device as described in claim 1., mounted for rotation about a central axis extending lengthwise of a vehicle with said arcuately curved extended and returned portions extending forwardly of said central portion of said rotating element, wherein:

the rearward and outermost surface of said rotating element is colored red and the forward and innermost surface of said rotating element is colored white, whereby red light is retroreflected from said signaling and warning device toward a light source located rearwardly of a vehicle on which said device is so mounted, and peripherally distributed white light and centrally located red light is retroreflected from said signaling and warning device toward a light source located forwardly of a vehicle on which said device is so mounted, and substantially half red and substantially half white light is retroreflected from said signaling and warning device toward a light source located to either side or above or below a vehicle on which said device is so mounted.

* * * * *